(12) United States Patent
Kato et al.

(10) Patent No.: US 9,236,746 B2
(45) Date of Patent: Jan. 12, 2016

(54) BIPOLAR BATTERY CONTROL DEVICE FOR ADJUSTING A VOLTAGE OR CAPACITANCE IN CELLS

(75) Inventors: Yukinari Kato, Kanagawa (JP); Takaaki Abe, Kanagawa (JP); Yasuhito Miyazaki, Kanagawa (JP); Yoshio Shimoida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 401 days.

(21) Appl. No.: 13/812,295

(22) PCT Filed: Aug. 3, 2011

(86) PCT No.: PCT/JP2011/067756
§ 371 (c)(1),
(2), (4) Date: Jan. 25, 2013

(87) PCT Pub. No.: WO2012/026295
PCT Pub. Date: Mar. 1, 2012

(65) Prior Publication Data
US 2013/0127422 A1    May 23, 2013

(30) Foreign Application Priority Data

Aug. 27, 2010 (JP) ................. 2010-190797

(51) Int. Cl.
*H02J 7/00* (2006.01)
*H01M 10/44* (2006.01)
(Continued)

(52) U.S. Cl.
CPC .............. *H02J 7/00* (2013.01); *H01M 10/441* (2013.01); *H01M 10/482* (2013.01); *H02J 7/0021* (2013.01); *H01M 10/0418* (2013.01); *H01M 10/052* (2013.01)

(58) Field of Classification Search
CPC ....... H02J 7/00; H02J 7/0021; H01M 10/441; H01M 10/482; H01M 10/052; H01M 10/0418
See application file for complete search history.

(56) References Cited

U.S. PATENT DOCUMENTS 3,982,960 A * 9/1976 Hoekje et al. ............. 429/199
5,880,575 A    3/1999 Itou et al.
(Continued)

FOREIGN PATENT DOCUMENTS

CN    101046505 A    10/2007
JP    2003-061257 A    2/2003
(Continued)

OTHER PUBLICATIONS

An English translation of the Russian Decision on Grant for the corresponding Russian Application No. 2013111536, issued on Apr. 23, 2014.
(Continued)

*Primary Examiner* — Naum B Levin
(74) *Attorney, Agent, or Firm* — Global IP Counselors, LLP

(57) ABSTRACT

A battery control device is provided that uses a discharge to adjust the capacitance of cells that form a bipolar battery and calculates the voltage increase value of the remaining cells that do not discharge to adjust capacitance if one or more cells, among all of the cells that form the bipolar battery, are discharged to adjust capacitance in a battery control device that controls voltage dispersion or volume dispersion between cells that form the bipolar battery; and setting the general discharge value when there is a discharge to adjust capacitance on the basis of the result of the voltage increase value calculation.

4 Claims, 8 Drawing Sheets

(51) Int. Cl.
*H01M 10/48* (2006.01)
*H01M 10/052* (2010.01)
*H01M 10/04* (2006.01)

(56) References Cited

U.S. PATENT DOCUMENTS

| | | | | |
|---|---|---|---|---|
| 6,518,725 | B2* | 2/2003 | Marten | 320/116 |
| 6,614,233 | B2* | 9/2003 | Sugimoto | 324/434 |
| 6,645,675 | B1* | 11/2003 | Munshi | 429/305 |
| 7,091,698 | B2 | 8/2006 | Yamazaki et al. | |
| 7,138,775 | B2* | 11/2006 | Sugimoto et al. | 318/140 |
| 7,244,527 | B2* | 7/2007 | Klein | 429/122 |
| 7,476,463 | B2* | 1/2009 | Desilvestro et al. | 429/152 |
| 7,609,029 | B2* | 10/2009 | Shimamura et al. | 320/116 |
| 7,719,231 | B2 | 5/2010 | Pellenc | |
| 7,759,005 | B2* | 7/2010 | Hosaka et al. | 429/210 |
| 7,927,740 | B2* | 4/2011 | Inagaki et al. | 429/231.1 |
| 7,989,106 | B2* | 8/2011 | Kinoshita et al. | 429/211 |
| 8,323,829 | B2* | 12/2012 | Nakamura | 429/209 |
| 8,697,289 | B2* | 4/2014 | Matsuyama et al. | 429/235 |
| 2005/0084754 | A1* | 4/2005 | Klein | 429/210 |
| 2007/0210760 | A1* | 9/2007 | Shimamura et al. | 320/135 |
| 2007/0212604 | A1* | 9/2007 | Ovshinsky et al. | 429/210 |
| 2008/0179082 | A1* | 7/2008 | Kinoshita | H01M 10/4257 174/255 |
| 2008/0248335 | A1* | 10/2008 | Kinoshita | H01M 10/0418 429/7 |
| 2009/0039830 | A1* | 2/2009 | Pellenc | 320/116 |
| 2009/0173582 | A1* | 7/2009 | Ogg | 187/290 |
| 2010/0237830 | A1* | 9/2010 | Castelaz et al. | 320/118 |

FOREIGN PATENT DOCUMENTS

| | | |
|---|---|---|
| JP | 2005-192310 A | 7/2005 |
| JP | 3702575 B2 | 7/2005 |
| JP | 2006-127857 A | 5/2006 |
| JP | 2007-273444 A | 10/2007 |
| JP | 2010-086875 A | 4/2010 |
| RU | 53818 U1 | 5/2006 |
| RU | 2368039 C2 | 9/2009 |

OTHER PUBLICATIONS

An English translation of the Russian Notice of Allowance for the corresponding Russian patent application No. 2013111536/07(017065) issued on Apr. 28, 2014.
An English translation of the Chinese Office Action for the corresponding Chinese patent application No. 201180041823.0, issued on Sep. 18, 2014.

* cited by examiner

BIPOLAR BATTERY CONTROL DEVICE FOR ADJUSTING A VOLTAGE OR CAPACITANCE IN CELLS

CROSS-REFERENCE TO RELATED APPLICATIONS

This application is a U.S. National stage application of International Application No. PCT/JP2011/067756, filed Aug. 3, 2011, which claims priority claims priority to Japanese Patent Application No. 2010-190797, filed in Japan on Aug. 27, 2010, the entire contents of which is hereby incorporated by reference.

BACKGROUND

1. Field of the Invention

The present invention relates to a battery control device for a bipolar battery.

2. Background Information

A known bipolar battery comprises a plurality of cells formed between adjacent pairs of collectors, each of the cells comprising a plurality of bipolar electrodes connected in series with electrolyte layers in-between and each of the bipolar electrodes comprising a collector having a positive pole active material layer formed on one face and a negative pole active material layer formed on the other face. In this type of bipolar battery, a technology that involves discharging to adjust the capacitance of the cells that form the bipolar battery by providing voltage detection lines to the bipolar electrodes and using said voltage detection lines has been disclosed, for example, in Japanese Laid-Open Patent Application No. 2006-127857.

SUMMARY

However, the voltage gradient in the bipolar battery at a time of a discharge to adjust the capacitance is not considered in the aforementioned prior art when discharging to adjust the capacitance in the cells that form a bipolar battery. Therefore, voltage increase occurs locally in a bipolar battery. As a result, sections that exceed the upper limit voltage are created in a bipolar battery and degradation progresses in a bipolar battery.

The objective of the present invention is to adequately prevent degradation in a bipolar battery caused by a local voltage increase in a bipolar battery when discharging to adjust the capacitance of the cells that form a bipolar battery.

The present invention achieves the aforementioned objective in a battery control device, which adjusts the voltage dispersion or the capacitance dispersion between the cells that form a bipolar battery by discharging to adjust the capacitance of the cells that from a bipolar battery, by calculating the voltage increase value of the remaining cells that are not discharged when a discharge to adjust the capacitance is carried out on one or more cells from among the cells that form a bipolar battery and setting a general discharge current value for discharging to adjust the capacitance on the basis of said voltage increase value calculation results.

According to the present invention, the voltage increase value of the remaining cells that are not discharged is calculated when discharging to adjust the capacitance of the cells that form a bipolar battery and a general discharge current value for discharging to adjust the capacitance is set on the basis of said voltage increase value calculation results. Therefore, it is possible to prevent the voltage of the remaining cells that are not discharged from becoming greater than a predetermined upper limit voltage. As a result, degradation in a bipolar battery can be prevented.

DETAILED DESCRIPTION OF THE EMBODIMENTS

Embodiments of the present invention will be explained below based on the drawings.

Figure 1:
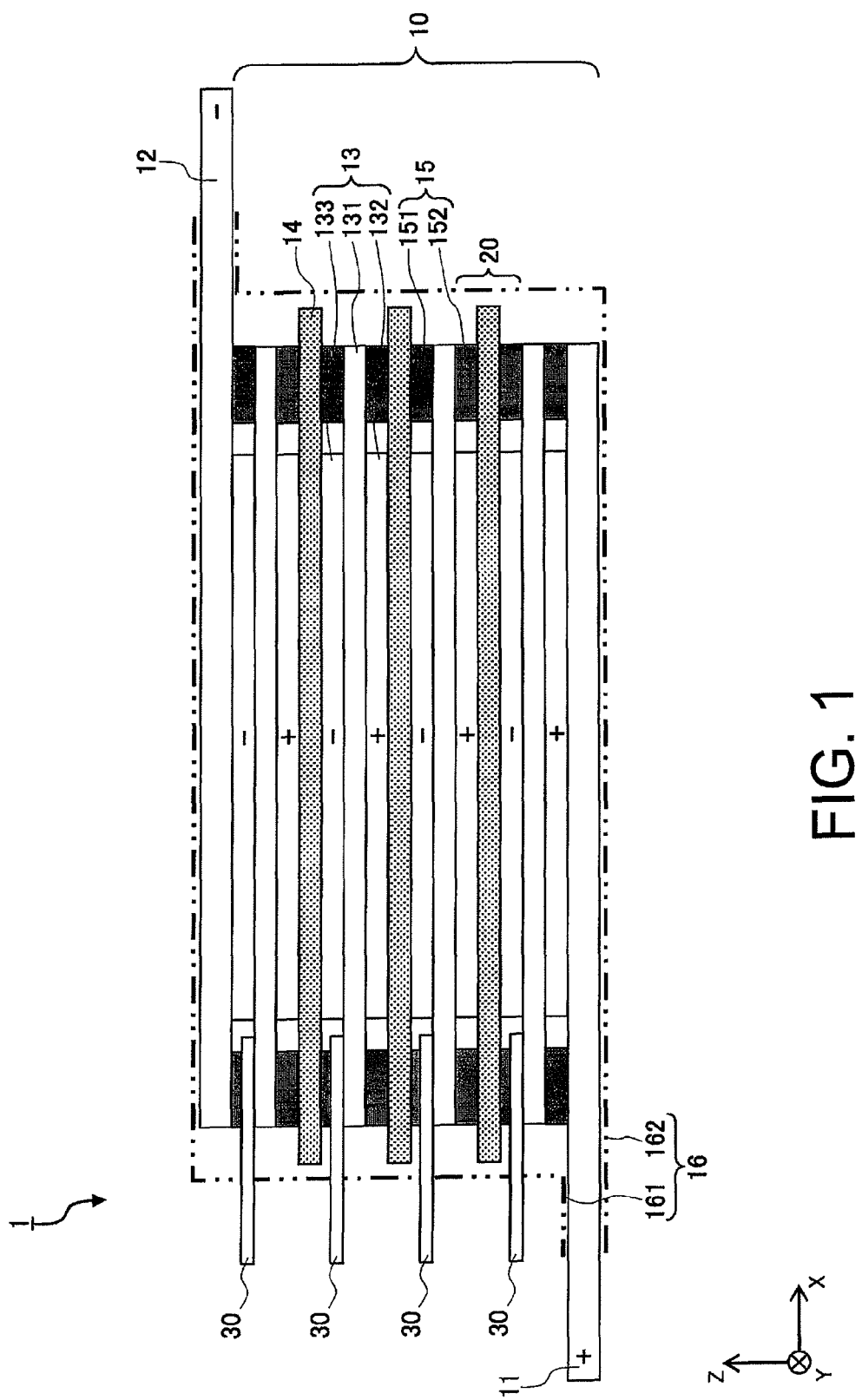
FIG. 1 is a cross sectional view showing a bipolar battery related to an embodiment of the present invention.

First of all, a bipolar battery related to an embodiment of the present invention will be explained. FIG. 1 is a cross sectional view showing a bipolar battery related to an embodiment of the present invention. In the explanation below, a case wherein the bipolar battery related to an embodiment of the present invention is a lithium ion secondary battery will be used as an example. However, the present invention is not limited in particular to this type of secondary battery and can be applied to other secondary batteries.

As shown in FIG. 1, a bipolar battery 1 according to an embodiment of the present invention comprises a bipolar electrode 13 that has positive a pole active material layer 132, a negative pole active material layer 133, and a collector 131, a separator 14, a seal part 15 that includes a first seal part 151 and a second seal part 152, and an exterior member 16 that includes an upper exterior member 161 and a lower exterior member 162 for covering the abovementioned parts.

The bipolar electrode 13 is composed by forming the positive pole active material layer 132 on one face of the collector 131 and the negative pole active material layer 133 on the other face.

The collector 131 is an electroconductive layer formed from a thin film obtained by filling electroconductive fillers in an insulating polymer. In the embodiment of the present invention, the electroconductivity of the collector 131 can be made low in the in-plane direction of the collector 131 while maintaining the electroconductivity in the thickness direction of the collector 131 by using a thin film obtained by filling electroconductive fillers in an insulating polymer as the collector 131. By doing so, current concentration in the short circuit area can be effectively be prevented in the bipolar battery 1 even when a short circuit occurs in the lamination direction and the stability of secondary battery 1 can be enhanced.

In particular, the electroconductive filler for forming collector 131 is not restricted and can be selected according to the purpose. For example, carbon black, metal particulates, conductive ceramics, or the like can be used. Also, the insulating polymer for forming the collector 131 is not restricted in particular and can be selected according to the purpose. For example, insulating polymers with thermal plasticity such as polyethylene, polypropylene, and polystyrene can be used.

The positive pole active material layer 132 includes a positive pole active material. Also, the positive pole active material layer 132 can include conductivity assisting agents, binders, and electrolytes in addition to the positive pole active material. As the positive pole active material, lithium manganese oxide $LiMn_2O_4$, lithium cobalt oxide, and other lithium-transition metal oxides are used. Also, as the conductivity assisting agent, for example, acetylene black, carbon black, graphite, and the like are used. Furthermore, as the binder, vinylidene polyfluoride, styrene-butadiene rubber, and the like are used.

As the electrolyte, a gel electrolyte, wherein an electrolytic solution is held by a polymer skeletal structure, a totally solid polymer electrolyte that does not include a plasticizer, and the like can be used in addition to an electrolytic solution.

The electrolytic solution is a solution obtained by dissolving an electrolytic salt in a plasticizer. As the electrolytic salt, inorganic acid anion lithium salts such as $LiPF_6$, $LiBF_4$, $LiClO_4$, $LiAsF_6$, $LiTaF_6$, $LiAlCl_4$, $Li_2B_{10}Cl_{10}$, and the like and organic acid anion lithium salts such as $LiCF_3SO_3$, $Li(CF_3SO_2)2N$, $Li(C_2F_5SO_2)_2N$, and the like can be used. Also, as the plasticizer, cyclic carbonates such as propylene carbonate, ethylene carbonate, and the like; chain carbonates such as dimethyl carbonate, methyl ethyl carbonate, diethyl carbonate, and the like; ethers such as tetrahydrofuran, 2-methyl tetrahydrofuran, 1,4-dioxane, 1,2-dimethoxyethane, 1,2-dibutoxy ethane, and the like; lactones such as γ-butyrolactone, and the like; nitriles such as acetonitrile, and the like; esters such as propionic acid methyl, and the like; amides such as dimethylformamide, and the like; methyl acetate, methyl formate; and the like can be used.

As the polymer that forms a gel electrolyte, for example, polyethylene oxide (PEO), polypropylene oxide (PPO), polyethylene glycol (PEG), polyacrylonitrile (PAN), polyvinylidene fluoride-co-hexafluoropropene (PVdF-HFP), poly (methyl methacrylate) (PMMA), and copolymers of these can be used.

A totally solid polymer electrolyte is formed from the aforementioned electrolytic salts and polymer that has ion conductivity. The polymer that has ion conductivity is not restricted in particular and commonly known polymers can be used. For example, polyethylene oxide (PEO), polypropylene oxide (PPO), and copolymers of these can be used. Also, the polymer that has ion conductivity can be formed with a cross-linking structure to provide excellent mechanical strength.

The negative pole active material layer 133 includes a negative pole active material. The negative pole active material layer 133 can include conductivity assisting agents, binders, and electrolytes in addition to the negative pole active material. As the negative pole active material, for example, hard carbon (difficult to carbonize carbon material), graphite carbon material, lithium-transition metal oxides, and the like are used. Also, the aforementioned materials can be used as the conductivity assisting agent, binder, and electrolyte.

The first seal part 151 is arranged on one face of the collector 131 so that it surrounds the positive pole active material layer 132. Also, the second seal part 152 is arranged on the back face at the same position as that of the first seal part 151 and is the other face of the collector 131 so that it surrounds the negative pole active material layer 133.

The seal material that forms the first seal part 151 and the second seal part 152 is composed from an insulating material such as liquid epoxy resin and other thermosetting resins, polypropylene, polyethylene and other thermoplastic resins, and the like. The material that forms the first seal part 151 and the second seal part 152 should manifest a favorable sealing effect under the use environment and should be appropriately selected according to the application of the battery.

The separator 14 is arranged between two adjacent collectors 131 and 131 so that one face covers the positive electrode active material layer 132 and the first seal part 151 and the other face covers the negative electrode active material layer 133 and the second seal part 152.

The separator 14 is a porous film for separating the positive electrode active material layer 132 and the negative electrode active material layer 133 and electrolyte is impregnated in this separator 14. This separator 14 is an insulator for preventing direct contact between the positive electrode active material layer 132 and the negative electrode active material layer 133 but can manifest ion conductivity by the electrolyte impregnating into the many pores formed in separator 14. As the separator 14, for example, a porous film formed from a polyolefin such as polyethylene PE and polypropylene PP, cellulose, and the like is used. As the electrolyte impregnated in the separator 14, the aforementioned electrolytes can be used. When using a totally solid polymer electrolyte as the electrolyte, a configuration wherein a film formed from a totally solid polymer electrolyte is used instead of using a porous film as the separator 14 can be employed as a substitute for the constitution wherein a totally solid polymer electrolyte is impregnated in a porous film that forms the separator 14.

And then, a plurality of bipolar electrodes 13 and separators 14 are alternately laminated to form an electrode laminate 10 as shown in FIG. 1. The electrode laminate 10 is made by laminating a plurality of bipolar electrodes 13 and separators 14 alternately to form a plurality of cells 20 (power generating elements) connected in series, each of the cells 20 comprising a positive electrode active material layer 132, a separator 14, and a negative electrode active material layer 133. FIG. 1 shows an example in which four bipolar electrodes 13 and three separators 14 are laminated alternately and to obtain three of the cells 20 connected in series. However, the number of laminations for bipolar electrodes 13 and separators 14 and the number of cells 20 formed as a result are not restricted in particular to the numbers shown in FIG. 1 and can be appropriately determined according to the purpose.

Also, the electrode laminate 10 is accommodated in an exterior member 16 that includes an upper exterior member 161 and a lower exterior member 162 to protect from external impact and to prevent environmental degradation. With decreasing the weight and thermal conductivity in mind, the exterior member 16 is formed from a sealing material such as a laminated film compounded of metal and polymer obtained by covering a metal (includes alloys) such as aluminum, stainless steel, nickel, copper, or the like with an insulator such as a polypropylene film or the like and thermally fusing one part or the entire part of its periphery.

Furthermore, a positive electrode terminal plate 11 and a negative electrode terminal plate 12, respectively, are arranged on the outermost layers (uppermost position and lowermost position) of the electrode laminate 10. Also, the positive electrode terminal plate 11 and the negative electrode terminal plate 12 are respectively lead out to the outside of the exterior member 16 and function as electrode tabs for leading current out from the electrode laminate 10.

Also, in the bipolar battery 1 of the present embodiment, a discharge terminal 30 is formed in the collector 131 of the respective bipolar electrode 13 and is respectively connected electrically to the collector 131 as shown in FIG. 1. The discharge terminal 30 extends to the outside of the exterior member 16 and is used to carry out detection of the voltage in the cells 20 that form the electrode laminate 10 and discharge to adjust the capacitance of the cells 20.

Figure 2:
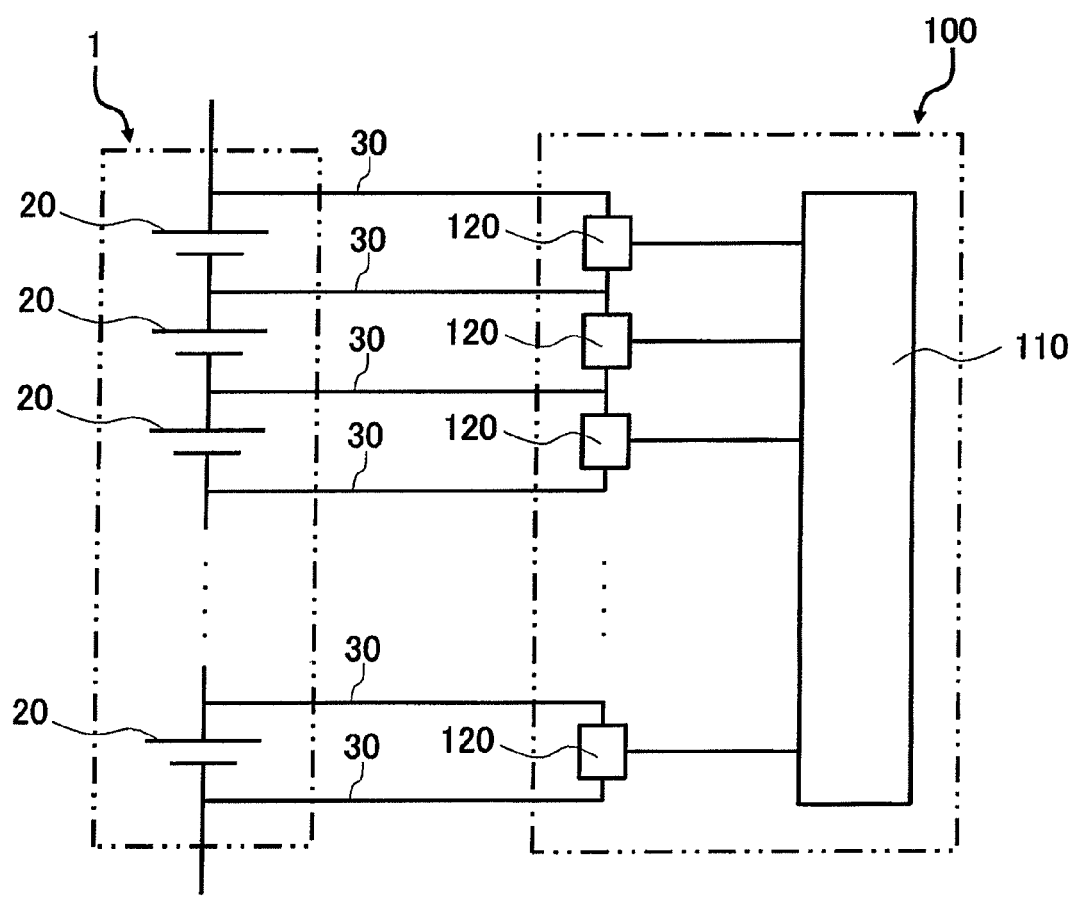
FIG. 2 is a diagram showing a schematic diagram of the control system for bipolar battery 1 related to an embodiment of the present invention.

FIG. 2 shows a schematic diagram of a control system for the bipolar battery 1 related to an embodiment of the present invention. As shown in FIG. 2, a control system of the bipolar battery 1 comprises the bipolar battery 1 and the battery control device 100.

The battery control device 100 comprises a general controller 110 and a plurality of cell controllers 120 that are provided to correspond with the cells 20 that form the bipolar battery 1.

Each of the cell controllers 120 has a voltage detection sensor and a capacitance adjusting circuit comprising an adjustment resistor and a switching element. And then, each of the cell controllers 120 is connected to a discharge terminal 30 that is extends to the outside of the bipolar battery 1. As a result, voltage detection of the cells 20 that form the bipolar battery 1 and discharge to adjust the capacitance are enabled through the discharge terminal 30. The bipolar battery 1 is normally connected to various electrical loads (not shown in the figures), generators (not shown in the figures), and the like.

The general controller 110 obtains information such as the voltage of the cells 20, the charge/discharge current of the bipolar battery 1, the temperature of bipolar battery 1, and the like detected by the cell controllers 120. The charge/discharge current of the bipolar battery 1 can be measured, for example, with a current sensor (not shown in the figures) for measuring the charge/discharge current of the bipolar battery 1. Also, the temperature of the bipolar battery 1 can be measured with a temperature sensor (not shown in the figures) for measuring the temperature of the bipolar battery 1. And then, the general controller 110 determines the conditions for discharge to adjust the capacitance in order to adjust the voltage dispersion of the cells 20 that form the bipolar battery 1 on the basis of the aforementioned information and controls the cell controllers 120 so that discharge to adjust the capacitance is carried out on the cells 20 that form the bipolar battery 1.

Next, the battery characteristics when a discharge to adjust the capacitance is carried out on the cells 20 that form the bipolar battery 1 will be explained.

Figure 3:
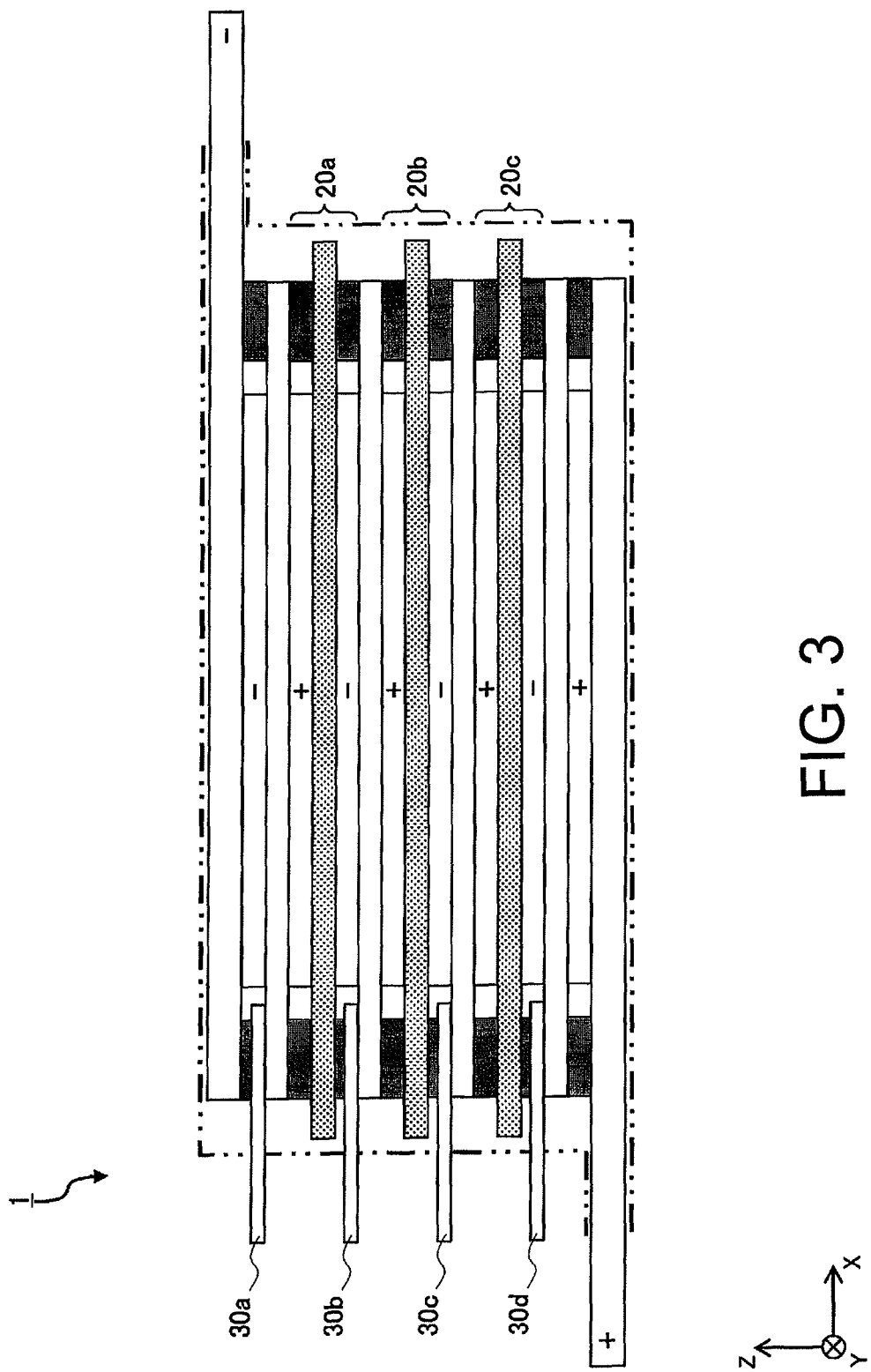
FIG. 3 is a cross sectional view showing an example of a bipolar battery related to an embodiment of the present invention.
Figure 4:
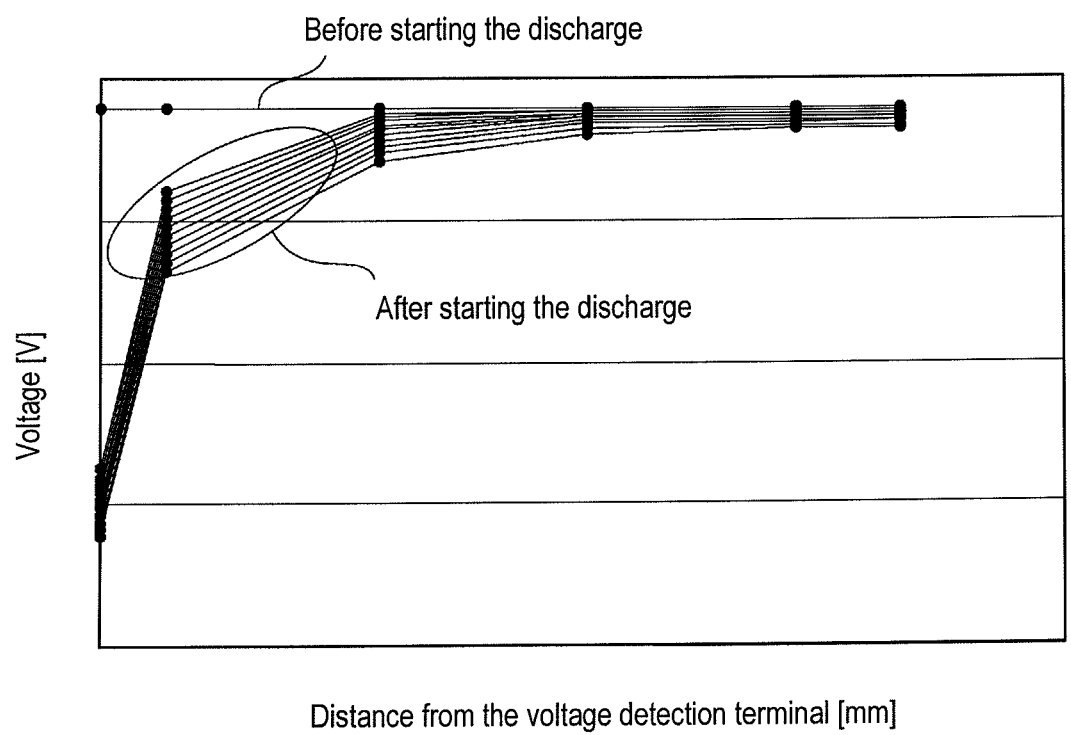
FIG. 4 is a graph showing the distribution of the voltage at each predetermined time before starting the discharge and after starting the discharge in the cells that were discharged.

First of all, an explanation will given for a situation wherein a discharge was carried out only on the cell 20b, which is the second cell from the top (second in the x-direction) from among three of the cells 20a, 20b, and 20c by providing a discharge resistor between the discharge terminals 30b and 30c in the bipolar battery 1 that has three of the cells 20a, 20b, and 20c shown in FIG. 3. The bipolar battery 1 shown in FIG. 3 has a configuration similar to FIG. 1. In FIG. 3, the cells 20 are indicated as the cells 20a, 20b, and 20c and the discharge terminals 30 are indicated as discharge the terminals 30a, 30b, 30c, and 30d. FIG. 4 shows the results for when discharge is carried out only on the cell 20b from among three of the cells 20a, 20b, and 20c. FIG. 4 is a graph that shows the voltage distribution of the cell (cell 20b) that was discharged at a predetermined time before the start of discharge and after the start of discharge. FIG. 4 shows the voltage distribution of the cell 20b for each distance from the discharge terminals 30b and 30c, which are the terminals for discharging to adjust the capacitance.

As shown in FIG. 4, the voltage of the cell 20b is constant before the start of discharge regardless of the distance from the discharge terminals 30b and 30c, which are the terminals for discharging to adjust the capacitance. On the other hand, when the discharge starts, decrease in the voltage results at the vicinity of the discharge terminals 30b and 30c where discharge current is flowing, whereas decrease in the voltage hardly occurs in the section far from the discharge terminals 30b and 30c (for example, the section positioned on the opposite side from the projecting direction of the discharge terminals 30b and 30c in FIG. 3). Namely, generation of a voltage gradient results in the cell 20b. The generation of said voltage gradient in the embodiment of the present invention is the result of using a material of low electronic conductivity in the in-plane direction (x y in-plane direction) for the material that forms the collector 131 to prevent concentration of current in the short circuit occurrence area when a short circuit occurs in the lamination direction. As described above, in the cell 20b on which discharge is carried out, generation of a voltage gradient results in the cell 20b.

Figure 5:
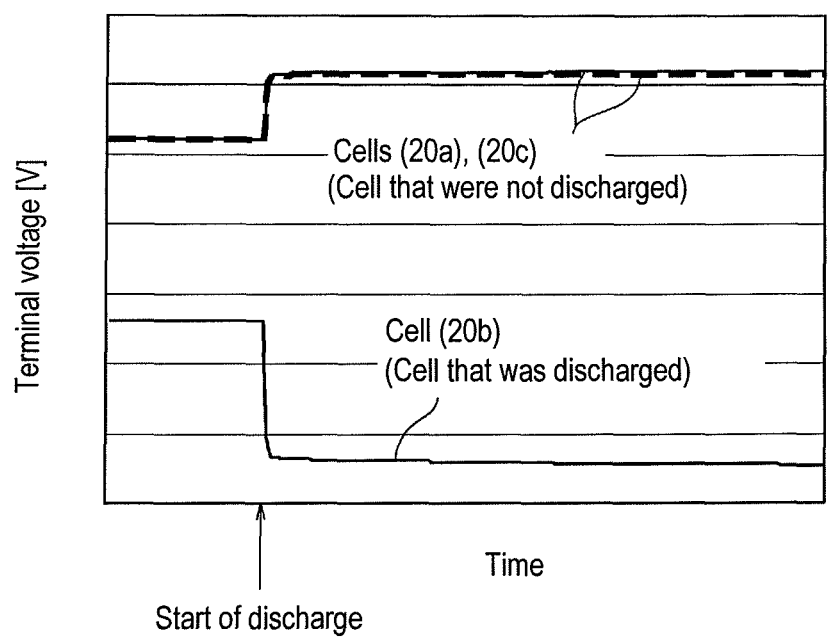
FIG. 5 is a graph showing the changes in the terminal voltage of the cells that were discharged and the cells that are not discharged.

On the other hand, FIG. 5 shows the changes in the terminal voltage (terminal voltage of the cells 20b, 20a, and 20c detected using the discharge terminals 30a to 30d) of the cell 20b, which is the cell that is discharged and the cells 20a and 20c, which are the cells that were not discharged before and after the start of discharge. As shown in FIG. 5, when discharge is carried out only on the cell 20b, a behavior results wherein the voltage decreases at the vicinity of the discharge terminals 30b and 30c in the cell 20b, which is the cell that was discharged whereas the voltage increases at the vicinity of the discharge terminals 30a and 30b and at the vicinity of the discharge terminals 30c and 30d in the cells 20a and 20c, which are the cells that were not discharged. Namely, a behavior wherein a decrease in the voltage in cell 20b is compensated by discharging of the cell 20b is manifested in the cells 20a and 20c that are not discharged.

Figure 6:
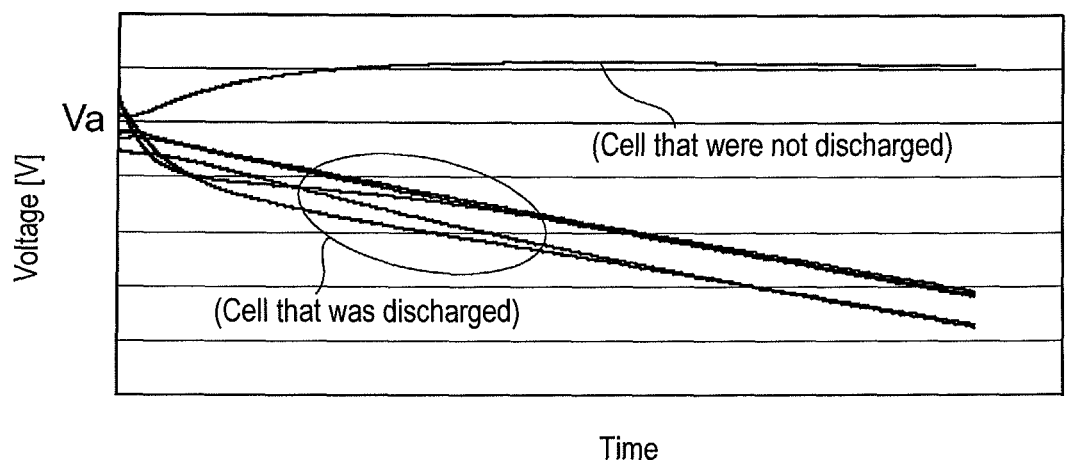
FIG. 6 is a graph showing the changes in the voltage on the discharge terminal side of the cells that were discharged and the cells that are not discharged.
Figure 7:
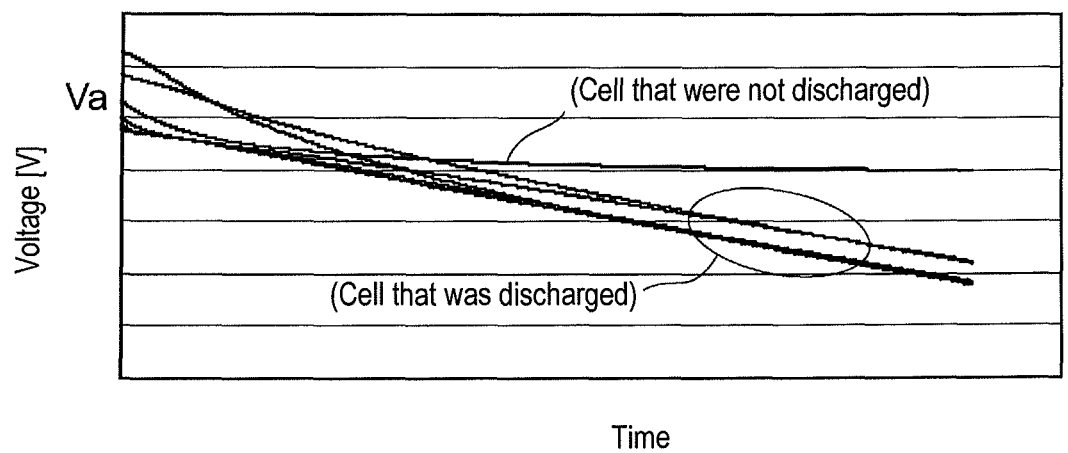
FIG. 7 is a graph showing the changes in the voltage on the opposite side from the discharge terminal of the cells that were discharged and the cells that are not discharged.

Also, the results of a simulation in the case where discharge is carried out through the discharge terminals 30 on seven of the cells 20 (all cells except for the cell positioned in the fourth layer in the lamination direction) from among eight cells 20 in bipolar battery 1 provided with eight cells 20 are shown in FIG. 6 and FIG. 7. These results vary from the above case. FIG. 6 is a graph showing the changes in the voltage in the cells 20 on the discharge terminal side of the discharge terminal 30 and FIG. 7 is a graph showing the changes in the voltage in the cells 20 on the opposite side from the discharge terminal 30. Also, initial voltage (voltage before discharge) of the cell 20 that was not discharged is Va in FIGS. 6 and 7.

As shown in FIG. 6, the results on the discharge terminal 30 side indicated that the voltage decreased with a lapse in time in the cells that were discharged whereas the voltage increased in the cell that was not discharged to compensate for the voltage decrease in the cells that were discharged. In the example shown in FIG. 6, discharge is carried out on seven of the cells 20. The voltage increase in the cell that was not discharged in this case is about 100 mV and indicated a result that the voltage increase value in the cell that was not discharged is greater in comparison to when discharge was carried out in one cell in the aforementioned bipolar battery that has three cells. Namely, there is a tendency for the voltage increase in the cell that is not discharged to become greater when the number of discharged cells and the total discharge current value become large. On the other hand, the opposite side from the discharge terminal 30 indicated a result that voltage increase is not observed in the cell that was not discharged as shown in FIG. 7.

As described above, in the bipolar battery 1, when a discharge to adjust the capacitance is carried out through the discharge terminals 30 on one portion of the cells from among the cells 20 that form the bipolar battery 1, a voltage dispersion is created inside the cells with a discharge to adjust the capacitance was carried out. As a consequence, a voltage increase is generated in the cell that was not discharged to compensate for the voltage dispersion. As a result, there are cases wherein sections that exceed a predetermined upper limit voltage are created inside the bipolar battery.

Figure 8:
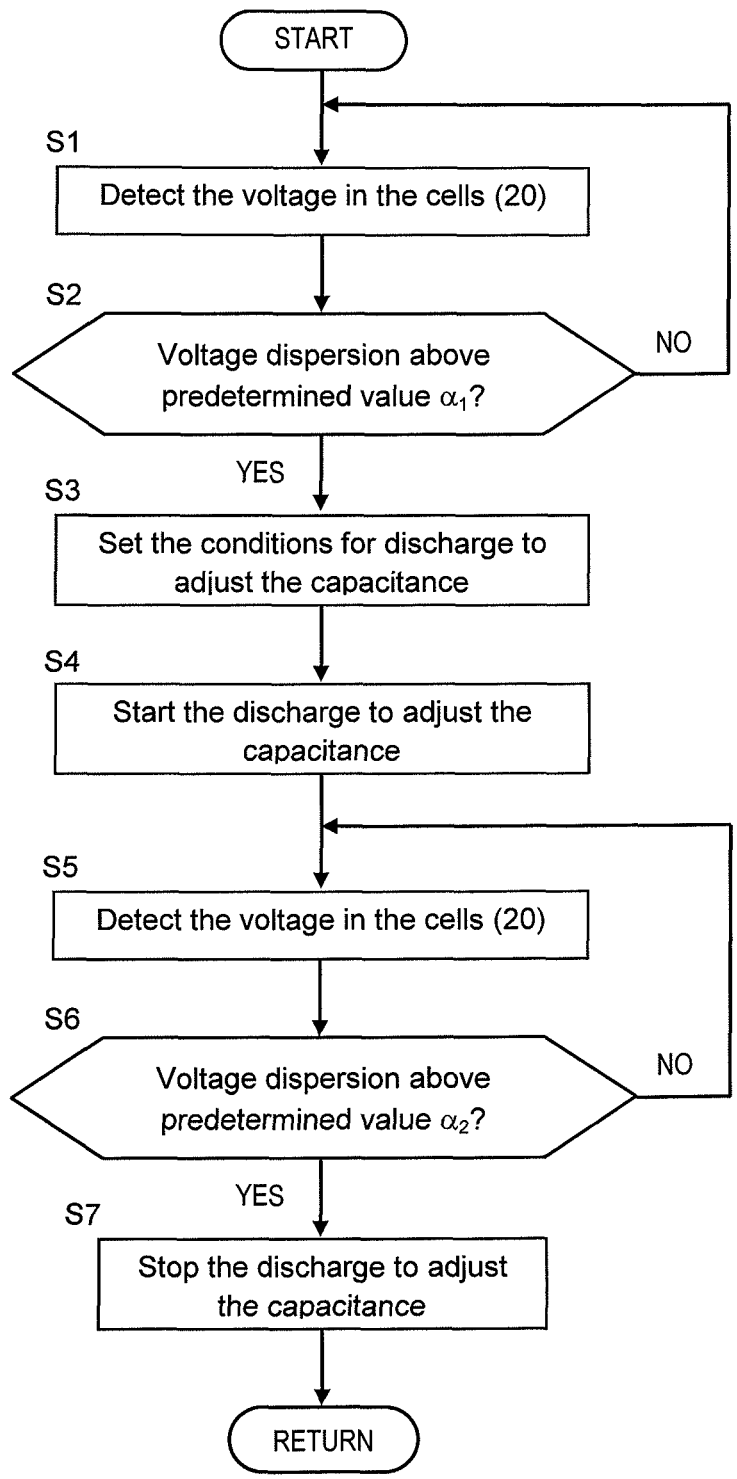
FIG. 8 is a flow chart showing the process for discharging to adjust the capacitance of bipolar battery 1 with battery control device 100 in an embodiment of the present invention.

On the contrary, the battery control device 100 in the embodiment of the present invention shown in FIG. 2 carries out a discharge to adjust the capacitance in the bipolar battery 1 by giving consideration to said voltage increase in the cell that was not discharged when discharging to adjust the capacitance. Below, discharge to adjust the capacitance in the bipolar battery 1 by using the battery control device 100 in an embodiment of the present invention will be explained according to the flow chart shown in FIG. 8. FIG. 8 is a flow chart showing the process for discharging to adjust the capacitance in the bipolar battery 1 using the battery control device 100 in an embodiment of the present invention.

First of all, in step S1, detection of the voltage in the cells 20 that form the bipolar battery 1 is carried out with the general controller 110 of the battery control device 100 shown in FIG. 2. The voltage detection of the cells 20 is carried out by general controller 110 obtaining the voltages measured by the cell controllers 120 through the discharge terminals 30 from the cell controllers 120.

Next, in step S2, calculation of the voltage distribution of the cells 20 that form the bipolar battery 1 is carried out with the general controller 110 on the basis of the voltages of cells 20 detected in step S1 and calculation of the voltage dispersion of the cells 20 is carried out from the calculated voltage distribution of the cells 20. And then, the general controller 110 carries out a judgment on whether or not the calculated voltage dispersion is above a predetermined value $\alpha_1$ and if the voltage dispersion is above the predetermined value $\alpha_1$, advancement is made to step S3. On the other hand, if the voltage dispersion is below the predetermined value $\alpha_1$, the process returns to step S1, voltage detection of the cells 20 and judgment on whether or not the calculated voltage dispersion is above the predetermined value $\alpha_1$ are repeated.

When a judgment is made in step S2 that the voltage dispersion is above the predetermined value $\alpha_1$, advancement is made to step S3 and general controller 110 sets the conditions for discharging to adjust the capacitance in the cells 20 that form the bipolar battery 1. Namely, the general controller 110 obtains a total discharge current value $I_{all}$ for discharging to adjust the capacitance on the basis of the voltage of the cell with the lowest voltage (hereinafter referred to as "lowest voltage cell") from among the cells 20 that form the bipolar battery 1 and the voltage distribution of the cells 20 and calculates the number of cells targeted for discharge to adjust the capacitance (hereinafter referred to as "discharge target cell number") and a capacitance adjustment discharge current value $I_{cell}$ of each cell for discharging to adjust the capacitance.

As described above, if a discharge to adjust the capacitance is carried out on the cells 20 that form the bipolar battery 1, the voltage of the cell that was not discharged increases. Therefore, in the embodiment of the present invention, the voltage increase value of the cells that are not discharged is calculated and the total discharge current value $I_{all}$, discharge target cell number, and the capacitance adjustment discharge current value $I_{cell}$ are calculated on the basis of the calculated voltage increase value. Specifically, in the embodiment of the present invention, the lowest voltage cell is used for calculating the voltage increase value, the voltage increase value of the lowest voltage cell at a time when discharge to adjust the capacitance was carried in the cells 20 that form bipolar battery 1 is calculated, the total discharge current value $I_{all}$, which is a value wherein the calculated voltage increase value of the lowest voltage cell does not reach a predetermined upper limit voltage is obtained, and discharge object cell number and the capacitance adjustment discharge current value $I_{cell}$ are set on the basis of this total discharge current value $I_{all}$. Namely, the conditions for discharging to adjust the capacitance is set so that the voltage increase value of the lowest voltage cell as the cell that is not discharged is a value that does not reach a predetermined upper limit voltage. Incidentally, to obtain said voltage increase value, it is possible to use, for example, a method of storing a table indicating the relationships between the total discharge current value $I_{all}$ and the voltage increase values of cells that are not discharged beforehand and carrying out the calculation by employing this table.

Setting of the discharge object cell number and the capacitance adjustment discharge current value $I_{cell}$ can also be carried out on the basis of the voltage distribution of cells 20. For example, it can be constituted so that if the number of cells with a high voltage is relatively small, the discharge target cell number is set at a relatively small number and the capacitance adjustment discharge current value $I_{cell}$ at a relatively high value or if the number of cells with a high voltage is relatively large, the discharge target cell number is set at a relatively large number and the capacitance adjustment discharge current value $I_{cell}$ at a relatively low value.

In step S4, a process to start a discharge to adjust the capacitance is carried out by general controller 110 on the basis of the discharge target cell number and the capacitance adjustment discharge current value $I_{cell}$ that were calculated in step S3. Specifically, the general controller 110 determines the cells for discharging to adjust the capacitance from among the cells 20 that form the bipolar battery 1 on the basis of the discharge target cell number that was calculated in step S3 and the voltage dispersion of the cells 20 that was calculated in step S2. Incidentally, as the method for determining the cells for discharging to adjust the capacitance, for example, the method of setting in order from the cell with a high voltage can be used. And then, discharging to adjust the capacitance is started by the general controller 110 by transmitting a discharge command and information on the capacitance adjustment discharge current value $I_{cell}$ to the cell controllers 120 corresponding to the cells for discharging to adjust the capacitance.

Next, in step S5, detection of the voltages of the cells 20 that form the bipolar battery 1 is carried out by the general controller 110 in the same manner as in the aforementioned step S1.

Next, in step S6, the general controller 110 carries out a calculation on the voltage dispersion of the cells 20 that form the bipolar battery 1 on the basis of the cells 20 detected in step S5 and a calculation on the voltage dispersion of the cells 20 on the basis of the calculated voltage distribution of the cells 20. And then, the general controller 110 carries out a judgment on whether or not the calculated voltage dispersion is below a predetermined value $\alpha_2$ and if the voltage dispersion is below the predetermined value $\alpha_2$, advancement is made to step S7. On the other hand, if the voltage dispersion is above the predetermined value $\alpha_2$, return is made to step S5 and discharge to adjust the capacitance is continued until the voltage dispersion reaches a value below the predetermined value $α_2$. Incidentally, the predetermined value $α_2$ is not restricted to particular fixed value. Rather, it is set at a value capable of judging that the voltage dispersion of the cells 20 is sufficiently low. Normally, it is set at a value smaller than the predetermined value $α_1$.

If a judgment is made in step S6 that the voltage dispersion is below the predetermined value $α_2$, advancement is made to step S7. A judgment can be made in step S7 that the voltage dispersion is below the predetermined value $α_2$ and the voltage dispersion of cells 20 has decreased sufficiently. Therefore, a process to stop the discharge to adjust the capacitance is carried out by the general controller 110. Specifically, the general controller 110 carries out a process of stopping the discharge to adjust the capacitance by transmitting a command to stop the discharge to the cell controllers 120.

In the embodiments of the present invention, the conditions for discharging to adjust the capacitance in the cells 20 that form the bipolar battery 1 are set by giving consideration to generation of a voltage gradient in the cells that are discharged which is caused by the electronic transmission in the in-plane direction of the collectors 131 and voltage increase in the cells that are not discharged when discharging to adjust the capacitance in the cells 20 that form the bipolar battery 1. Specifically, in the embodiments of the present invention, when discharging to adjust the capacitance in the cells 20 that form the bipolar battery 1, the voltage increase value of the cells that are not discharged is calculated, the total discharge current value $I_{all}$ for discharging to adjust the capacitance is obtained so that said voltage increase value does not exceed a predetermined upper limit voltage, and the discharge target cell number and the capacitance adjustment discharge current value $I_{cell}$ are set on the basis of the obtained total discharge current value $I_{all}$. Consequently, according to the embodiments of the present invention, it is possible to prevent the voltage from exceeding a predetermined upper limit voltage in all of the cells 20 that form the bipolar battery 1, and as a result, degradation of the bipolar battery 1 can be prevented. In particular, according to the embodiments of the present invention, the speed for adjusting the voltage dispersion caused by discharge to adjust the capacitance can be enhanced when the possibility for the cells that are not discharged to exceed a predetermined upper limit is low by calculating the voltage increase value of the cells that are not discharged. Therefore, the voltage dispersion in the bipolar battery 1 can be dealt with at an early stage while at the same time preventing the degradation of the bipolar battery 1.

In addition, according to the embodiments of the present invention, the discharge target cell number is set so that the voltage increase value of the cells that are not discharged does not exceed a predetermined upper limit voltage when discharging to adjust the capacitance. Consequently, the discharge to adjust the capacitance can be carried out to correspond with the number of cells with a high voltage when the number of cells with a high voltage is relatively small. As a result, the voltage dispersion of the bipolar battery 1 can be addressed at an early stage. Also, the capacitance adjustment discharge current value $I_{cell}$ is set so that the voltage increase value of the cells that are not discharged does not exceed a predetermined upper limit voltage when discharging to adjust the capacitance. Consequently, the discharge to adjust the capacitance can be carried out on a comparatively large number of cells while at the same time preventing the degradation of bipolar battery 1.

The embodiments of the present invention were explained above. However, these embodiments were provided to make the understanding of the present invention easy and were not provided to restrict the present invention. Therefore, the elements disclosed in the aforementioned embodiments include all design changes and equivalent items belonging to the technological scope of the present invention.

In the aforementioned embodiments, a configuration which makes a judgment on whether or not to carry out a discharge to adjust the capacitance, sets the conditions for discharging to adjust the capacitance, and makes a judgment on whether or not to stop the discharge to adjust the capacitance on the basis of the voltage dispersion of the cells 20 that form the bipolar battery 1, was shown as an example. However, the device can be configured to obtain the capacitance dispersion and the SOC dispersion of the cells 20, make a decision on whether or not to carry out a discharge to adjust the capacitance, set the conditions for discharging to adjust the capacitance, and make a judgment on whether or not to stop the discharge to adjust the capacitance on the basis of the capacitance dispersion and the SOC dispersion.

DESCRIPTIONS OF THE REFERENCE SYMBOLS

1 . . . bipolar battery
10 . . . electrode laminate
13 . . . bipolar electrode
131 . . . collector
132 . . . positive electrode active material layer
133 . . . negative electrode active material layer
14 . . . separator
20, 20a, 20b, 20c . . . cells
30, 30a, 30b, 30c, 30d . . . discharge terminals
100 . . . battery control device
110 . . . controller
120 . . . cell controller

The invention claimed is:
1. A bipolar battery control device comprising:
a controller programmed to adjust one of a voltage dispersion and a capacitance dispersion of one or more of a plurality of alternately laminated cells of a bipolar battery by discharging the bipolar battery such that some of the cells of the bipolar battery are discharged and some of the cells are not discharged, in which each of the cells includes a positive pole active material layer formed on one face and a negative pole active material layer formed on the other face, with a current collector formed of an electroconductive thin film between adjacent ones of the cells,
the controller being programmed to perform a voltage increase value calculation that calculates a voltage increase value of the cells of the bipolar battery that were not discharged after a discharge of the bipolar battery to adjust the one of the voltage dispersion and the capacitance dispersion carried out on one or more of the cells that form the bipolar battery,
the controller being programmed to determine a general discharge current value for discharging to adjust the capacitance based on a result of the voltage increase value calculation.
2. The bipolar battery control device as described in claim 1, wherein
the controller is further programmed to determine a number of cells to be discharged to adjust the capacitance from among all of the cells that form the bipolar battery based on the result of the voltage increase value calculation.

3. The bipolar battery control device as described in claim 2, wherein
the controller is further programmed to determine a discharge current value of the cells to be discharged to adjust the capacitance based on the result of the voltage increase value calculation.

4. The bipolar battery control device as described in claim 1, wherein
the controller is further programmed to determine a discharge current value of the cells to be discharged to adjust the capacitance based on the result of the voltage increase value calculation.

\* \* \* \* \*